(12) United States Patent
Phillips et al.

(10) Patent No.: US 8,388,479 B2
(45) Date of Patent: Mar. 5, 2013

(54) AUTOMATIC TRANSMISSION HAVING TORQUE CONVERTER BYPASS

(75) Inventors: Andrew W. Phillips, Rochester, MI (US); Donald L. Dusenberry, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 13/095,986

(22) Filed: Apr. 28, 2011

(65) Prior Publication Data

US 2012/0277049 A1    Nov. 1, 2012

(51) Int. Cl.
*F16H 47/08* (2006.01)
(52) U.S. Cl. .......................................................... 475/55
(58) Field of Classification Search .................. None
See application file for complete search history.

(56) References Cited

U.S. PATENT DOCUMENTS

| | | | | |
|---|---|---|---|---|
| 2,889,715 A * | 6/1959 | De Lorean | ...................... | 475/55 |
| 3,084,569 A * | 4/1963 | Hause | .............................. | 475/55 |
| 3,106,107 A * | 10/1963 | Hardy | ............................ | 475/281 |
| 3,314,307 A * | 4/1967 | Egbert | ............................ | 475/56 |
| 3,355,966 A * | 12/1967 | Boehm | ............................ | 475/50 |
| 3,577,805 A * | 5/1971 | Ohno et al. | ..................... | 475/55 |
| 3,772,939 A * | 11/1973 | Hause | .............................. | 475/46 |
| 3,903,757 A * | 9/1975 | Hau et al. | ........................ | 475/57 |
| 4,289,044 A * | 9/1981 | Dorpmund et al. | ............. | 475/50 |
| 4,331,044 A * | 5/1982 | Bookout et al. | ................. | 475/56 |
| 4,346,622 A * | 8/1982 | Pierce | ............................ | 475/56 |
| 4,602,522 A * | 7/1986 | Dorpmund | ...................... | 475/56 |
| 4,811,631 A * | 3/1989 | Honig et al. | .................... | 475/56 |
| 4,813,301 A * | 3/1989 | Aoki | .............................. | 475/55 |
| 4,942,779 A * | 7/1990 | Ohkubo | .......................... | 475/39 |
| 5,466,195 A * | 11/1995 | Nogle et al. | .................... | 475/55 |

\* cited by examiner

*Primary Examiner* — Dirk Wright

(57) ABSTRACT

An automatic transmission having an improved lock up torque converter configuration includes two drive members: a first quill or tubular drive member which carries the output of the torque converter to the transmission gearbox and a second co-axial shaft or drive member which is driven by the torque converter lockup clutch and thus directly carries the engine output to the transmission gear box and bypasses the torque converter. The transmission gearbox includes two planetary gear assemblies having certain elements which are selectively grounded to the transmission housing by two friction brakes. This transmission, torque converter and torque converter clutch configuration prevents torque converter clutch engagement in its lower gear and forces torque converter clutch lockup in its upper gear.

20 Claims, 2 Drawing Sheets

AUTOMATIC TRANSMISSION HAVING TORQUE CONVERTER BYPASS

FIELD

The present disclosure relates to automatic transmissions for motor vehicles and more particularly to automatic transmissions having torque converter bypass in its upper gear or gears.

BACKGROUND

The statements in this section merely provide background information related to the present disclosure and may or may not constitute prior art.

Design and development of automatic transmissions for motor vehicles is ongoing. Given the multiple goals of improved performance, improved fuel economy and reduced cost, nearly every aspect of automatic transmissions has been scrutinized, evaluated and re-evaluated.

One of the areas of focus is the torque converter and the torque converter clutch. In order to achieve disconnection between the engine and transmission when the vehicle is in gear and stopped and allow the engine to idle, in order to provide a smooth launch, and in order to increase low speed torque, a torque converter is disposed between the output of the engine and the input of the transmission. The hydrodynamic fluid coupling and torque multiplication provided thereby achieves and satisfies all the foregoing requirements.

Unfortunately, it does so in a somewhat expensive and inefficient manner. The frictional losses in a torque converter contribute to the reduced efficiency and fuel economy of an automatic transmission relative to a manual transmission.

One approach to improving the efficiency of a torque converter involves the addition of a torque converter clutch or "TCC," a clutch in mechanical parallel with the torque converter which is engaged when the transmission reaches an upper gear (lower numerical ratio), thereby locking out the torque converter and avoiding or minimizing its inherent fluid and frictional losses. While the addition of a torque converter clutch has a significant impact on efficiency and fuel economy, it also increases the cost and complexity of the torque converter, the transmission and the powertrain. Hence, there is a desire to develop mechanical assemblies which, while providing the benefits of lock up torque converters, do so with reduced complexity and cost.

The present invention represents a further improvement relating to automatic transmissions and torque converter assemblies.

SUMMARY

The present invention provides an automatic transmission having an improved lock up torque converter configuration. The transmission/torque converter include two drive members: a first quill or tubular drive member which carries the output of the torque converter to the transmission gearbox and a second co-axial shaft or drive member which is driven by the torque converter lockup clutch and thus directly carries the engine output to the transmission gear box and bypasses the torque converter. This configuration, instead of achieving direct drive through the locked up torque converter, achieves it by bypassing the torque converter and transferring drive torque directly to the transmission gearbox in a separate shaft. The transmission gearbox includes two planetary gear assemblies having certain elements which are selectively grounded to the transmission housing by two friction brakes. This transmission, torque converter and torque converter clutch configuration prevents torque converter clutch engagement in lower gears and forces torque converter clutch lockup in upper gears.

It is thus an aspect of the present invention to provide an automatic transmission having an improved torque converter lockup clutch configuration.

It is a further aspect of the present invention to provide an automatic transmission having a shaft which extends through the torque converter to the transmission gearbox.

It is a still further aspect of the present invention to provide an automatic transmission having a quill which connects the torque converter output to the transmission gearbox and a shaft within the quill which connects the torque converter clutch output to the transmission gearbox.

It is a still further aspect of the present invention to provide an automatic transmission having a torque converter clutch which selectively connects the engine output to the transmission output shaft.

It is a still further aspect of the present invention to provide an automatic transmission having two planetary gear assemblies.

It is a still further aspect of the present invention to provide an automatic transmission having two selectively engageable friction brakes.

It is a still further aspect of the present invention to provide a torque converter clutch arrangement that prevents torque converter lockup in lower gears.

It is a still further aspect of the present invention to provide a torque converter clutch arrangement that forces torque converter lockup in upper gears.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
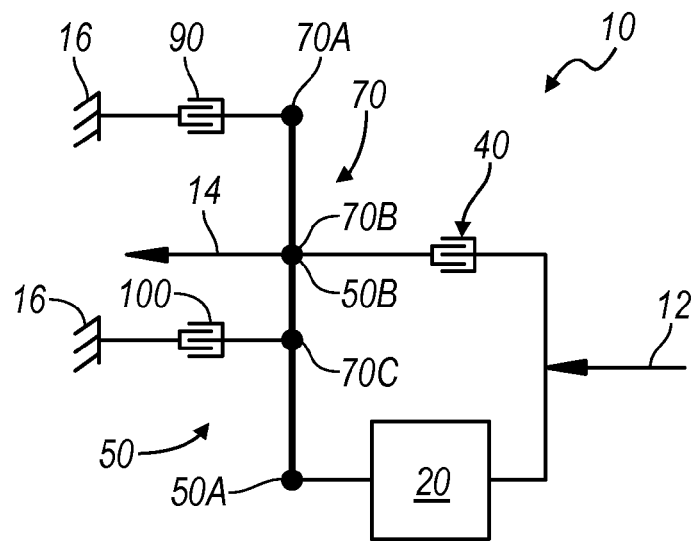
FIG. 1 is a lever diagram of a two speed automatic transmission having a torque converter bypass according to the present invention.

With reference to FIG. 1, a two speed automatic transmission having torque converter bypass according to the present invention is illustrated in a lever diagram and is designated by the reference number 10. A lever diagram is a schematic representation of the components of an automatic transmission wherein a planetary gear assembly is represented by a vertical bar or lever and the components of the planetary gear assemblies such as sun gears, planet gear carriers and ring gears are represented by nodes. The relative lengths of the vertical bars between the nodes represent the ratios between the components. Where, as here, there are only two planetary gear assemblies and a component of one planetary gear assembly is coupled directly to a component of another planetary gear assembly, the two levers are combined into a single lever having four nodes. Torque transmitting devices such as friction clutches and brakes are represented by interleaved or nested fingers. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The automatic transmission 10 includes an input shaft or member 12 which is coupled to and driven by the output of an internal combustion gas, Diesel or flex fuel engine or electric or hybrid power plant (not illustrated), an output shaft or member 14 which is coupled to and drives a final drive assembly (also not illustrated) which may include a prop shaft, a differential, axles and tires and wheels and a housing 16 which is referred to in FIG. 1 as ground. The input shaft or member 12 is coupled to and drives an input of a torque converter 20 and also an input of a torque converter clutch (TCC) 40.

The automatic transmission 10 also includes two planetary gear assemblies 50 and 70. The first planetary gear assembly 50 includes a first node 50A which is coupled to and driven by the output of the torque converter 20 and a second node 50B which is coupled to and drives the output shaft or member 14. There is no third node in the first planetary gear assembly 50. The second planetary gear assembly 70 includes a first node 70A, a second node 70B which is common with the second node 50B of the first planetary gear assembly 50 and which is coupled to and driven by the output of the torque converter clutch 40 and a third node 70C. A first friction brake 90 is disposed between the first node 70A of the second planetary gear assembly 70 and the transmission housing 16 (ground) and a second friction brake 100 is disposed between the third node 70C of the second planetary gear assembly 70 and the transmission housing 16 (ground).

Figure 2:
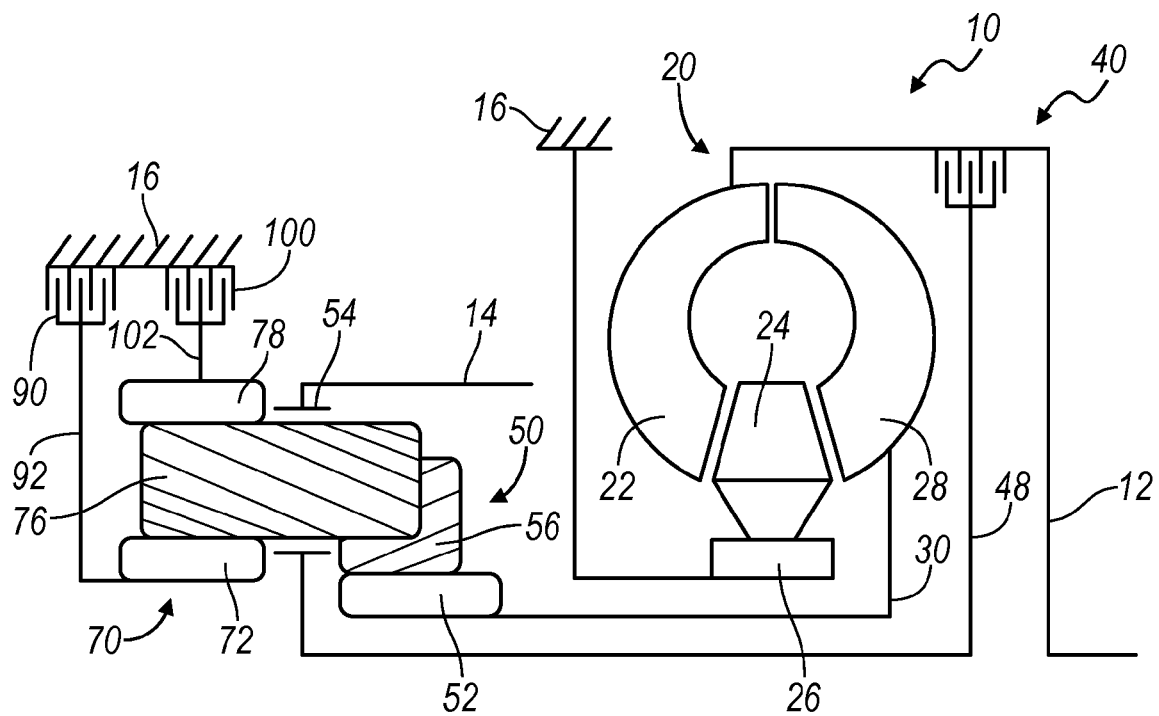
FIG. 2 is a schematic diagram of a two speed automatic transmission having a torque converter bypass according to the present invention.

Referring now to FIG. 2, the automatic transmission 10 includes the input shaft or member 12 which is coupled to and drives the input of the torque converter clutch 40 and a pump 22 within the torque converter 20. The torque converter 20 also includes a stator 24 which is connected through a one way or overrunning clutch 26 to the housing 16. The torque converter 20 further includes a turbine 28 which is connected through a first drive member 30 such as a quill or tubular drive component to a first sun gear 52 of the first planetary gear assembly 50.

The output of the torque converter clutch 40 is coupled through a second drive member 48 such as a shaft or quill to a planet gear carrier 54 common to both the first planetary gear assembly 50 and the second planetary gear assembly 70. The planet gear carrier 54 is also coupled to and drives the output shaft or member 14. The planet gear carrier 54 freely rotatably supports a plurality of first pinions or planet gears 56 that are typically disposed upon needle bearing assemblies supported on stub shafts (both not illustrated). The plurality of first pinions or planet gears 56 are in constant mesh with the first sun gear 52. There is no ring gear in the first planetary gear assembly 50.

Immediately adjacent the first planetary gear assembly 50 is a second planetary gear assembly 70. The second planetary gear assembly 70 includes a second sun gear 72, the planet gear carrier 54 which freely rotatably supports a plurality of second, elongate pinions or planet gears 76 that are typically disposed upon needle bearing assemblies supported on stub shafts (both not illustrated) and a second ring gear 78. One end of each of the plurality of second, elongate pinions or planet gears 76, the left ends in FIGS. 2 and 3, are in constant mesh with the second sun gear 72 and the second ring gear 78 and the other end of each of the plurality of second, elongate pinions or planet gears 76, the right ends in FIGS. 2 and 3, are in constant mesh with the plurality of first pinion or planet gears 56.

The first friction brake 90 is connected between the second sun gear 72 of the second planetary gear assembly 70 and the transmission housing 16 by a suitable first connecting member 92 and the second friction brake 100 is connected between the second ring gear 78 of the second planetary gear assembly 70 and the transmission housing 16 by an optional second connecting member 102.

Figure 3:
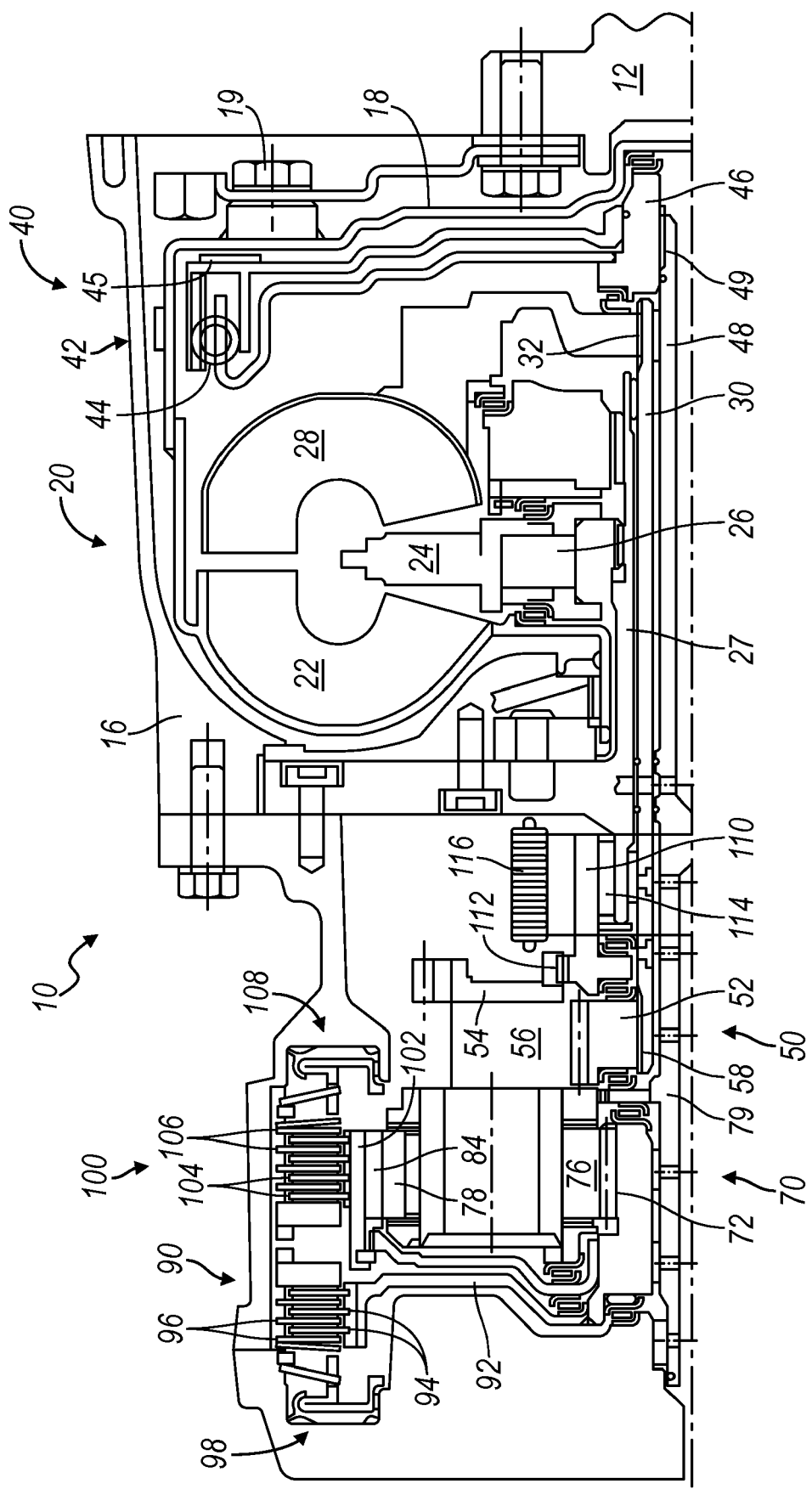
FIG. 3 is a fragmentary, full sectional view of a two speed automatic transmission having a torque converter bypass according to the present invention.

Referring now to FIG. 3, a fragmentary, full sectional view of the automatic transmission 10 illustrates the physical layout of the transmission and the torque converter bypass configuration. The input shaft or member 12 which may be the engine output shaft is coupled to a drive flange assembly 18 by suitable threaded fasteners 19 and may be piloted on the engine output shaft. The drive flange assembly 18 is connected to the pump 22 of the torque converter 20. The stator 24 of the torque converter 20 is connected through the one way or overrunning clutch 26 to a stationary internal annular support 27 which is secured to the housing 16. The turbine 28 of the torque converter 20 is connected through a first interengaging spline set 32 to the first drive member 30 which is a quill or similar tubular drive component which extends into the automatic transmission 10 proper, that is, the gearbox.

The torque converter lockup clutch 40 is disposed adjacent the drive flange assembly 18 which acts as a drive member therefor. Immediately adjacent the drive flange assembly 18 is a damper assembly 42 which includes a plurality of circumferentially oriented springs 44 and functions as the driven member of the torque converter lockup clutch 40. An annulus of friction material 45 is secured to one of the opposing faces of the drive flange assembly 18 and the damper assembly 42 and functions as the frictional interface of the torque converter clutch 40. The damper assembly 42 is piloted on, secured to and drives a damper hub 46. The damper hub 46 is, in turn, disposed upon a second drive member 48 which may be a shaft or quill which extends into the transmission gearbox and is connected thereto by a second interengaging spline set 49. The first drive member 30 and the second drive member 48 are co-axial.

Turning now to the first planetary gear assembly 50 and the second planetary gear assembly 70, which generally constitute the gearbox of the automatic transmission 10, the first drive member 30 includes a third interengaging spline set 58 which engages and drives the first sun gear 52. The second drive member 48 includes lugs, teeth or male splines 79 which engage complementarily configured recesses, teeth or splines (not illustrated) in the planet gear carrier 54 (which is coupled to and drives the output member 14).

The second sun gear 72 is coupled through the first connecting member 92 to a first set of friction clutch plates of discs 94 of the first friction brake 90. The first set of friction plates or discs 94 are interleaved with a second set of friction plates or discs 96 which are coupled to the housing 16. A first clutch actuator 98 which may be hydraulically, electrically or pneumatically operated is disposed in operable relationship with the sets of friction plates or discs 94 and 96. When the first actuator 98 is engaged or activated, the first friction brake 90 inhibits rotation of the second sun gear 72 by connecting it to the housing 16. The second ring gear 78 is coupled through a fifth interengaging spline set 84 and the optional second connecting member 102 to a third set of friction clutch plates of discs 104 of the second friction brake 100. The third set of friction plates or discs 104 are interleaved with a fourth set of friction plates or discs 106 which a coupled to the housing 16. A clutch actuator 108 which may be hydraulically, electrically or pneumatically operated is disposed in operable relationship with the sets of friction plates or discs 104 and 106. When the second actuator 108 is engaged or activated, the second friction brake 100 inhibits rotation of the second ring gear 78 by connecting it to the housing 16.

The planet gear carrier 54 of the first planetary gear assembly 50 is coupled to a chain drive sprocket 110 by lugs, gear teeth or splines 112 which is piloted and supported on a roller bearing assembly 114. The chain drive sprocket 110 engages a chain 116 which functions as the output member 14 and transfers drive torque to a final drive assembly (not illustrated).

It will be appreciated by those skilled in the transmission art that the automatic transmission 10 illustrated includes numerous features such as fasteners, seals, thrust and roller bearings and lubrication passageways and ports. Inasmuch as they are common and conventional features of such devices and form no inherent aspect of the present invention, they have not been not specifically identified as their incorporation and use are deemed to be understood.

Operation of the automatic transmission 10 will now be described briefly. Commencing from a stop, either the first friction brake 90 is engaged to achieve forward motion or the second friction brake is engaged to provide reverse. Assuming that the first friction brake 90 has been engaged, operation will commence in first gear, the speed of the output member 14 will increase and hydraulic pressure within the torque converter 20 and the torque converter lockup clutch 40 will increase. At a predetermined speed, the first friction brake 90 will be disengaged and the automatic transmission 10 will shift into the second of its two forward gears. Similarly, at a predetermined speed, the torque converter clutch 40 will lock up and provide direct drive from the input shaft 12, through the second drive member 48 and to the output member 14, such as the output chain 116, the torque flow path completely bypassing the torque converter 20.

The description of the invention is merely exemplary in nature and variations that do not depart from the gist of the invention are intended to be within the scope of the invention. Such variations are not to be regarded as a departure from the spirit and scope of the invention.

What is claimed is:

1. An automatic transmission and lockup torque converter comprising, in combination:
    an input member and an output member,
    a torque converter having a pump connected to said input member and a turbine,
    a first drive member connected to said turbine,
    a lockup clutch operably disposed between said input member and a second drive member,
    a first planetary gear assembly having a first sun gear connected to said first drive member and a planet gear carrier having a first plurality of planet gears and connected to said second drive member and said output member,
    a second planetary gear assembly having a second sun gear, a ring gear and a second plurality of planet gears disposed in said planet gear carrier and meshing with said first plurality of planet gears, and
    a first friction brake connected to said second sun gear and a second friction brake connected to said ring gear.

2. The automatic transmission of claim 1 wherein said first and said second drive members define a common axis.

3. The automatic transmission of claim 2 wherein said planetary gear assemblies are concentrically disposed on said common axis.

4. The automatic transmission of claim 1 further including a damper disposed adjacent said input member and wherein said lockup clutch is disposed between said input member and said damper.

5. The automatic transmission of claim 1 wherein said lockup clutch includes an annulus of friction material.

6. The automatic transmission of claim 1 wherein said first and second friction brakes include first and second pluralities of interleaved clutch plates.

7. The automatic transmission of claim 1 wherein engagement of said lockup clutch provides a torque path which bypasses said torque converter.

8. The automatic transmission of claim 1 further including a housing and a stator disposed in said torque converter and connected through a one way clutch to said housing and wherein said first and second friction brakes are connected to said housing.

9. A two speed automatic transmission comprising, in combination:
    an input member and an output member,
    a torque converter having a pump connected to said input member and a turbine,
    a first drive member connected to said turbine and a second drive member,
    a lockup clutch operably disposed between said input member and said second drive member,
    a first planetary gear assembly having a first sun gear connected to said first drive member and a planet gear carrier having a first plurality of planet gears meshing with said first sun gear and connected to said second drive member and said output member,
    a second planetary gear assembly having a second sun gear, a ring gear and a second plurality of planet gears disposed in said planet gear carrier and meshing with said first plurality of planet gears, said second sun gear and said ring gear, and
    a first brake operably connected to said second sun gear and a second brake operably connected to said ring gear.

10. The automatic transmission of claim 9 wherein said first and said second drive members define a common axis and said planetary gear assemblies are concentrically disposed on said common axis.

11. The automatic transmission of claim 9 further including a stator disposed in said torque converter and connected through a one way clutch to a housing.

12. The automatic transmission of claim 9 further including a damper disposed adjacent said input member and wherein said lockup clutch is disposed between said input member and said damper.

13. The automatic transmission of claim 9 wherein said lockup clutch includes an annulus of friction material.

14. The automatic transmission of claim 9 wherein said first and second friction brakes include first and second pluralities of interleaved clutch plates.

15. The automatic transmission of claim 9 wherein engagement of said lockup clutch provides a torque path which bypasses said torque converter.

16. An automatic transmission comprising, in combination:
    an input member adapted to be driven by an engine, an output member adapted to drive a final drive assembly and a housing,
    a torque converter having a pump driven by said input member and a turbine, a first drive member driven by said turbine and a second drive member co-axial with said first drive member, a lockup clutch operably disposed between said input member and said second drive member, a first planetary gear assembly having a first sun gear connected to said first drive member and a planet gear carrier having a first plurality of planet gears meshing with said first sun gear, said planet gear carrier connected to said second drive member and said output member, a second planetary gear assembly having a second sun gear, a ring gear and a second plurality of planet gears disposed in said planet gear carrier and meshing with said first plurality of planet gears, said second sun gear and said ring gear, and a first brake operably disposed between said second sun gear and said housing and a second brake operably disposed between said ring gear and said housing.

17. The automatic transmission of claim 16 further including a damper disposed adjacent said input member and wherein said lockup clutch is disposed between said input member and said damper.

18. The automatic transmission of claim 16 wherein said lockup clutch includes an annulus of friction material.

19. The automatic transmission of claim 16 wherein said first and second friction brakes include first and second pluralities of interleaved clutch plates.

20. The automatic transmission of claim 16 wherein engagement of said lockup clutch provides a torque path which bypasses said torque converter.

* * * * *